United States Patent
Ruszczyk (12)

(10) Patent No.: US 6,205,150 B1
(45) Date of Patent: Mar. 20, 2001

(54) METHOD OF SCHEDULING HIGHER AND LOWER PRIORITY DATA PACKETS

(75) Inventor: Chester A. Ruszczyk, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/086,394

(22) Filed: May 28, 1998

(51) Int. Cl.$^7$ .................................................. H04L 12/56
(52) U.S. Cl. ........................................ 370/412; 370/429
(58) Field of Search ................................. 370/412–418, 370/429

(56) References Cited

U.S. PATENT DOCUMENTS

| | | | |
|---|---|---|---|
| 4,644,533 | * | 2/1987 | Braff et al. ............................ 370/94 |
| 6,091,709 | * | 7/2000 | Harrison et al. ..................... 370/235 |

OTHER PUBLICATIONS

Figueira, N.R., 'A Solution For The Priority Queue Problem of Deadline–Ordered Service Disciplines', Sixth International Conference on Computer Communications and Networks, pp. 320–325, Sep. 1997.*

S. Shenker, C. Partridge, R. Guerin, "Internet Engineering Task Force, Request for Comments 2212, Specification of Guaranteed Quality of Service", Sep. 1997, pp. 1 to 20.

* cited by examiner

Primary Examiner—Melvin Marcelo
(74) Attorney, Agent, or Firm—McDonnell & Boehnen Hulbert & Berghoff; Stephen L. Esavich

(57) ABSTRACT

A method for scheduling lower priority and higher priority data packets in a network system is provided. The method allows a network device to schedule the order in which data packets are sent and received on a network system using dual queues. As the network device receives data packets, the network device places data packets into a first queue and sorts the data packets as higher priority and lower priority data packets based upon a transmission deadline of each data packet. Subsequently, the network device places the high priority data packets into a second queue and the lower priority data packets into a third queue. The network device schedules data packets for execution in the second using a first scheduling method while using a second scheduling method to schedule data packets in the third queue. When a transmission deadline for a lower priority data packet expires in the third queue, the network device promotes a data packet from the third queue to the second queue for rescheduling. This method ensures that lower priority data packets are not starved out of delayed in execution by higher priority data packets.

20 Claims, 4 Drawing Sheets

METHOD OF SCHEDULING HIGHER AND LOWER PRIORITY DATA PACKETS

FIELD OF INVENTION

The present invention relates to communications in computer networks. More specifically, it relates to a method for dynamically scheduling transmission of high and low priority data packets associated with a network device by utilizing dual queues, dual scheduling methods and a promoter.

BACKGROUND OF THE INVENTION

As is known in the art, an operating system is a set of software routines used to provide functionality to a computer system. One function of an operation system is to schedule and execute multiple tasks. The multiple tasks provide various functionality including reading and writing to memory and secondary storage, input and output to a computer display, execution of application programs, input and output to peripheral device and others. Many operating systems such as UNIX of Unix Systems Laboratories, owned by Novell of Provo, Utah, or Windows 95/NT by Microsoft Corporation of Redmond, Wash., provide operating systems that use priority schemes to schedule and execute tasks. Such priority schemes include various levels of priority from lower priority tasks to higher priority tasks.

Operating systems known in the art, use queues to schedule tasks of different priorities.

When tasks of varying priorities are used, one or more scheduling methods are used to specify an order in which to satisfy priority tasks in the queue. Examples of common scheduling methods include First-Come, First-Served ("FCFS"), Shortest-Job-First ("SJF"), Round Robin ("RR") and preemptive priority scheduling methods. Some of these methods ensure that higher priority tasks are executed before lower priority tasks, but also ensure that lower priority tasks are not "starved out" of execution time.

In a First-Come, First-Served scheduling method, a first task received in a queue is the first one executed. As the name suggests, in a Shortest-Job-First scheduling method the shortest task in terms of execution time, in the queue is executed first. Whereas, a Round Robin scheduling method grants each task a set amount of time, or "time-slice," to execute before moving on to the next task even if the previous one is not completed. After each task in the queue has executed for the time-slice, the round robin scheduling method repeats, or continues to "cycle," until all tasks in a queue are satisfied. Preemptive priority scheduling methods assign a priority to each task as it enters a queue. Tasks are executed in the queue in the order of the assigned priority; however, the method allows for specific tasks to execute immediately and thereby preempting higher priority tasks from executing. Each of these scheduling methods present various problems.

In the First-Come, First-Served scheduling method, an important task at the end, or "tail" of a queue must wait to be executed until tasks ahead of the it have been executed. Furthermore, a time-intensive task at the beginning, or "head," of the queue may prevent the remaining tasks is from executing. This is called "starving" which can lead to catastrophic events. For example, if a task in the queue such as one for memory maintenance is starved out, the computer system may fail due to lack of resources. To prevent the starving of shorter tasks by longer, more time-intensive tasks, the shortest-job-first scheduling method allows the shorter tasks to execute before the longer tasks. However, these methods run the risk of delaying higher priority tasks. The Round Robin attempts to prevent the delaying of high priority tasks by allocating only a "time-slice," to each task in the queue. Although each task is treated equal in priority, longer tasks may take many cycles of time-slices before completely executing. However, this may actually delay the execution of a high priority task. Thus, priority scheduling was developed to prevent lower priority tasks from delaying or "starving" out higher priority tasks.

The problems associated with scheduling tasks in an operating system also occur in multi-user network systems with a plurality of network connections, network devices and data packets. In a network system environment, a data packet is analogous to a task in an operating system. Customers on a network system may have different Customer Premise Equipment ("CPE") (i.e., a computer) with different capabilities, such as the ability to send and receive data packets at various data rates or bandwidth. In a multimedia system, logical multimedia channels are typically used by a network connection to create separate audio, video and data channels. The audio and video channels are typically allocated with predetermined, fixed maximum bandwidth. For example, on a modem connection an audio channel may have a bandwidth of 5,300 bits-per-second (bps) and a video channel may have a bandwidth of 23,500 bps for a multimedia bandwidth of 28,800 bps (i.e., the sum of the two channels). Many network hosts allow customers to subscribe to various Classes-of-Service ("CoS") and Qualities-of-Service ('QoS") to optimize reliability and data transmission speeds. As is known in the art, class-of-service provides a reliable (e.g., error free, in sequence, with no loss of duplication) transport facility independent of the quality-of-service. Class-of-service parameters include maximum downstream data rates, maximum upstream data rates, upstream channel priority, guaranteed minimum data rates, guaranteed maximum data rate and others. Quality-of-service collectively specifies the performance of a network service that a device expects on a network. Quality-of-service parameters include transit delay expected to deliver data to a specific destination, the level of protection from unauthorized monitoring or modification of data, cost for delivery of data, expected residual error probability, the relative priority associated with the data and other parameters. Higher class-of-service and quality-of-service connections transmit higher priority data packets. Thus, various customers on the network system will transmit and receive both high priority and low priority data packets.

In a network system, a network device, such as a router, is responsible for routing data packets to an appropriate device on a network topology. For example, a network system including a network host and multiple users, or customers, will utilize a router to direct downstream data packets (i.e., data packets from a network host) to the customer premise equipment and upstream data packets (i.e., data packets from the customer premise equipment) to the network host. Along with directing traffic from multiple customer premise equipment and the network host, the router also typically schedules the order in which data packets will be sent and received by the network host and customer premise equipment.

There are several problems associated with scheduling data packets of high and low priority from multiple network devices. Higher priority data packets which are transmission delay sensitive, are typically sent by a router on higher priced connections (e.g., charged time-of-use fees). Delay sensitive information includes voice, real-time video and other information sensitive to transmission delays. Such information can not be sent over connections that may have a large transmission delay without loss of information or loss of quality of information. Non-delay sensitive information and large bursts of data are typically sent over dedicated packet switched connections that are lower priced connections (i.e., charged monthly connection or bandwidth fees).

A router utilizes scheduling schemes analogous to those used by an operating system to manage tasks. When the router receives data packets from one or more customer premise equipment, the router typically places the data packets into a receive queue. After determining the priority associated with each data packet, the router uses one or more scheduling methods to schedule the order in which the router will send the data packets downstream to the network host by placing the data packets in a transmission queue. Likewise, the same router typically receives upstream data packets from the network host to be send to customer premise computers or other network devices on the network system. The router places upstream data packets in a receive queue, determines the priority associated with each data packet in the queue, and schedules the order of the data packets using use one or more scheduling methods and subsequently places the scheduled data packets into a transmission queue.

As in an operating system, the router must ensure that lower priority data packets are not starved out by higher priority data packets and thus, provide necessary class-of-service and quality-of-service transmission bandwidth for lower priority tasks. Furthermore, individual customers on the network system may have contracted with the network host for a particular class-of-service and quality-of-service. With the methodology of various scheduling methods, a router may schedule higher priority data packets to or from an individual customer such that the customer may actually receive a lower class-of-service or quality-of-service than what the customer subscribed for. Thus, it is desirable to develop scheduling methods to prevent higher types-of-service from starving out transmission requests from customers of lower types-of-service.

SUMMARY OF THE INVENTION

In accordance with a preferred embodiment of the present invention, the problems associated with scheduling and transferring lower priority and higher priority data packets are overcome. A method is provided for scheduling data packets in a combination queue using dual schedulers and a promoter such that both higher priority and lower priority data packets are transmitted for execution.

The method includes a first network device monitoring a first queue with multiple data packets of varying priorities and determining scheduling priorities or transmission deadlines for data packets in the first queue. The multiple data packets provide various class-of-service and quality-of-service connections. After a first network device determines the priority of the data packets, the first network device inserts higher priority data packets into a second queue and lower priority data packets into a third queue. The data packets in the second queue are scheduled for transmission using a first scheduling method as higher priority data packets. The data packets in the third queue are scheduled by a second scheduling method with transmission deadlines as lower priority data packets to be executed after the higher priority data packets. Transmission deadlines prevent lower priority data packets from being "starved out" or delayed of transmission bandwidth. "However, lower priority data packets in the third queue are dynamically promoted to the second queue for rescheduling as a high priority data packet once a transmission deadline has expired to ensure that low priority data packets are not starved out of transmission time. Lower priority data packets are transmitted to provide a minimum connection bandwidth. Higher priority data packets are transmitted to provide a contracted class-of-service or quality-of-service. Thus, the first network device dynamically schedules higher priority data packets while ensuring that lower priority data packets will be executed without delaying transmission time.

The foregoing and other features and advantages of an illustrative embodiment of the present invention will be more readily apparent from the following detailed description, which proceeds with references to the accompanying drawings.

DETAILED DESCRIMON OF A PREFERRED EMBODIMENT

Network system with multiple users and network devices

Figure 1:
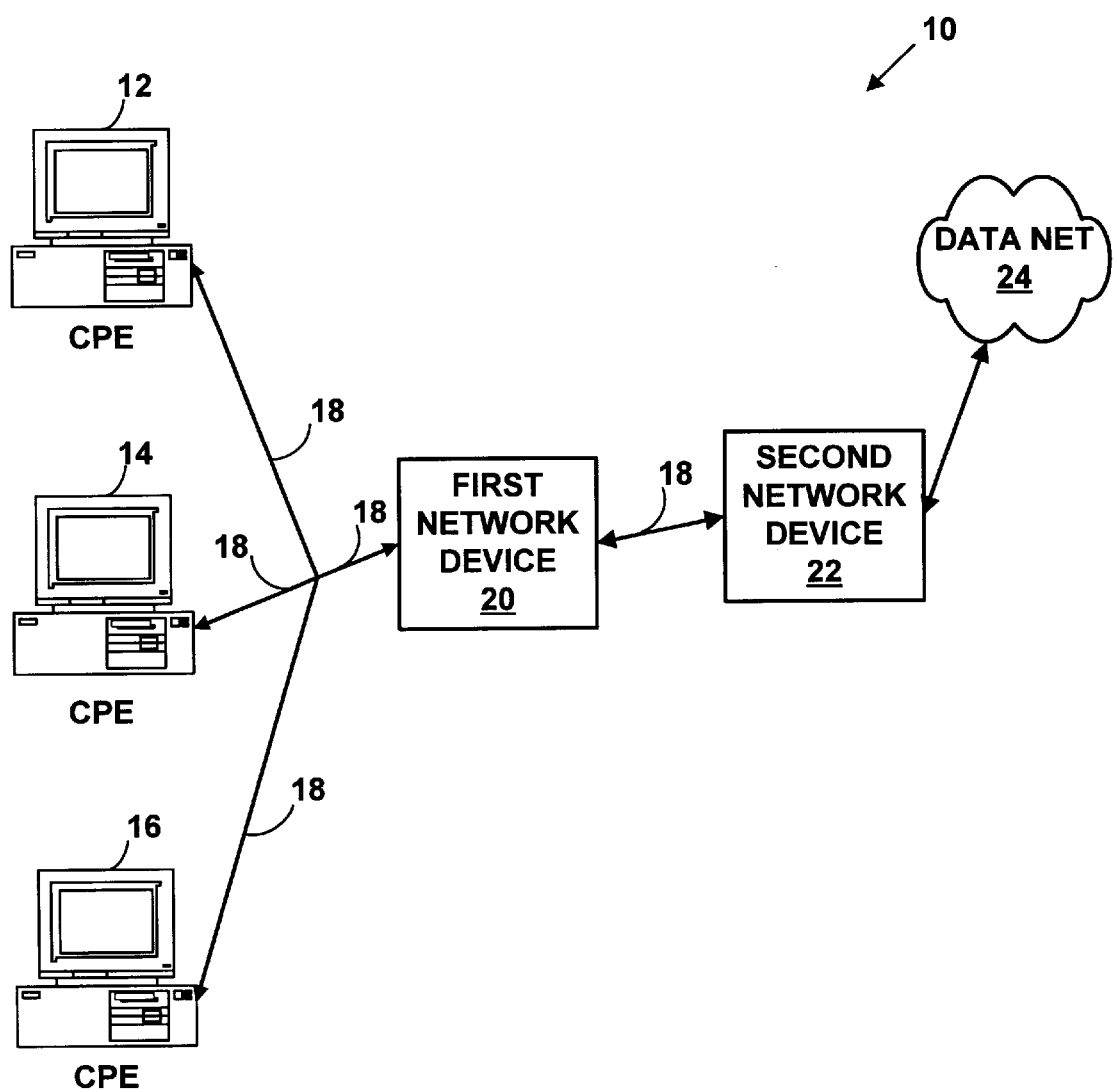
FIG. 1 is a block diagram illustrating a network system.

FIG. 1 is a block diagram illustrating a network system 10 with multiple network devices 12, 14, 16. In network system 10, multiple end users may connect to network system 10 using Customer Premise Equipment ("CPE") 12, 14, 16 such as a personal computer system via network connections 18. CPEs 12, 14, 16 on network system 10 send data packets with a variety of priorities from lower priority to higher priority data packets on network connections 18 to a first network device 20 which forwards the data packets to a second network device 22.

Second network device 22 may be connected to a data network 24 such as the Internet, an intranet or other computer network. The present invention is not limited to a network system 10 illustrated in FIG. 1 and more or fewer components, connections and interfaces could also be used.

Scheduling data packets using multiple queues

Figure 2:
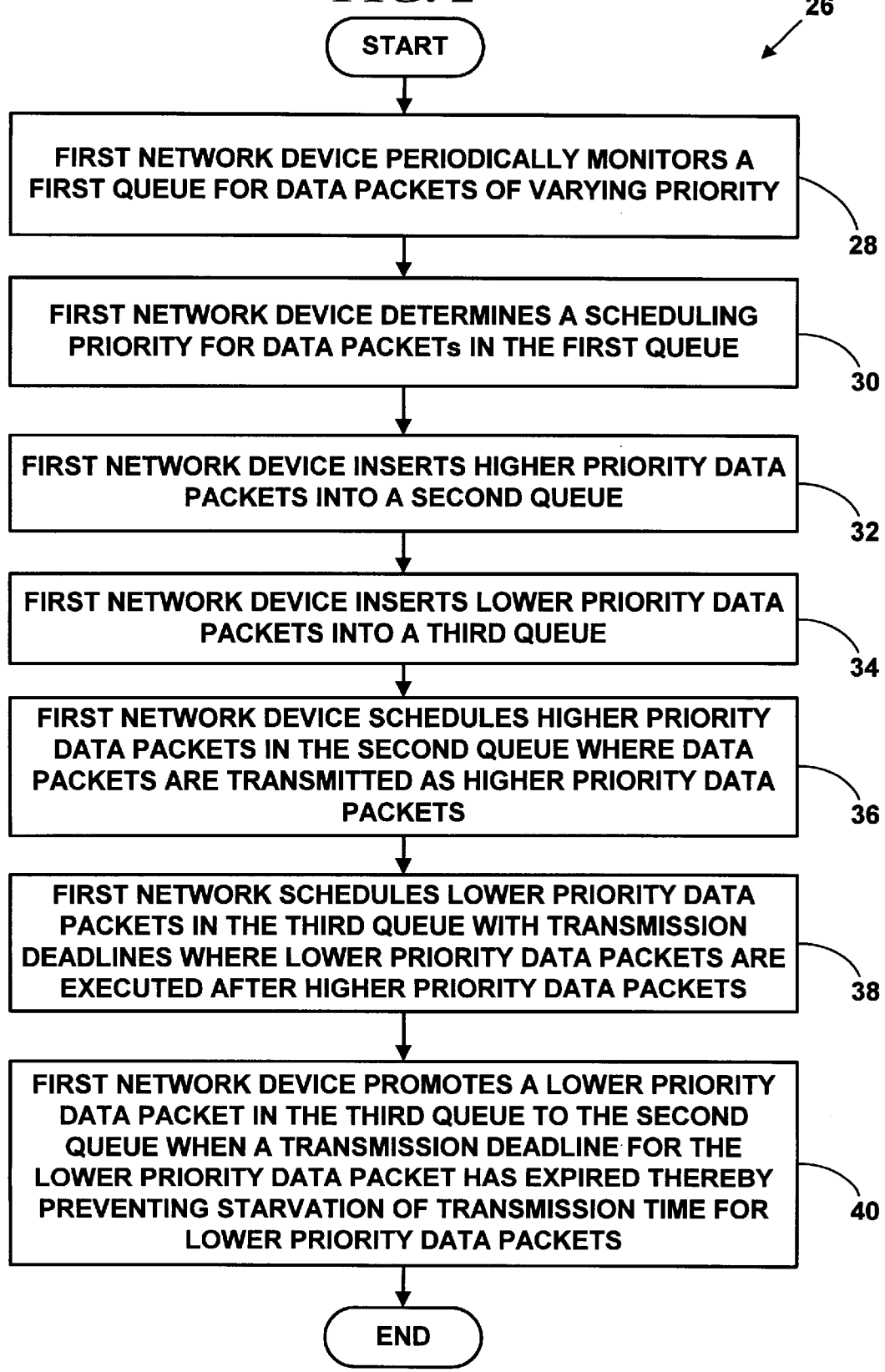
FIG. 2 is a flow diagram illustrating a method for scheduling data packets.

FIG. 2 is a flow diagram illustrating a method 26 for scheduling data packets of varying priority in network system 10. At step 28, first network device 20 periodically monitors a first queue for the presence of data packets having varing priority. Once first network device 20 detects data packets in the first queue, at step 30 first network device 20 determines a scheduling priority for data packets located in the first queue. At step 32, first network device 20 inserts the higher priority data packets into a second queue and at step 34 inserts the lower priority data packets into a third queue. At step 36, first network device 20 schedules the high priority data packets in the second queue and first network device 20 transmits the data packets as higher priority data packets. At step 38, first network device 20 schedules the lower priority data packets in the third queue with trasmission deadlines where lower priority data packets are transmitted after higher priority data packets. A transmission deadline prevents starvation of transmission bandwidth for lower priority data packets. When a transmission deadline for a low priority data packet in the third queue has expired, first network device 20 promotes the low priority data packet to the second queue at step 40 thereby preventing the starvation of transmission time for lower priority data packets.

In a preferred embodiment of the present invention, first network device 20 is a router. As is know in the art, a router receives data packets from multiple network devices, determines a priority of data packets and is responsible for directing network traffic by selecting which data packet and a time to transmit the data packets to designated network devices. The first queue is a combination queue, the second queue is high priority queue and the third queue is a low priority queue.

Figure 3:
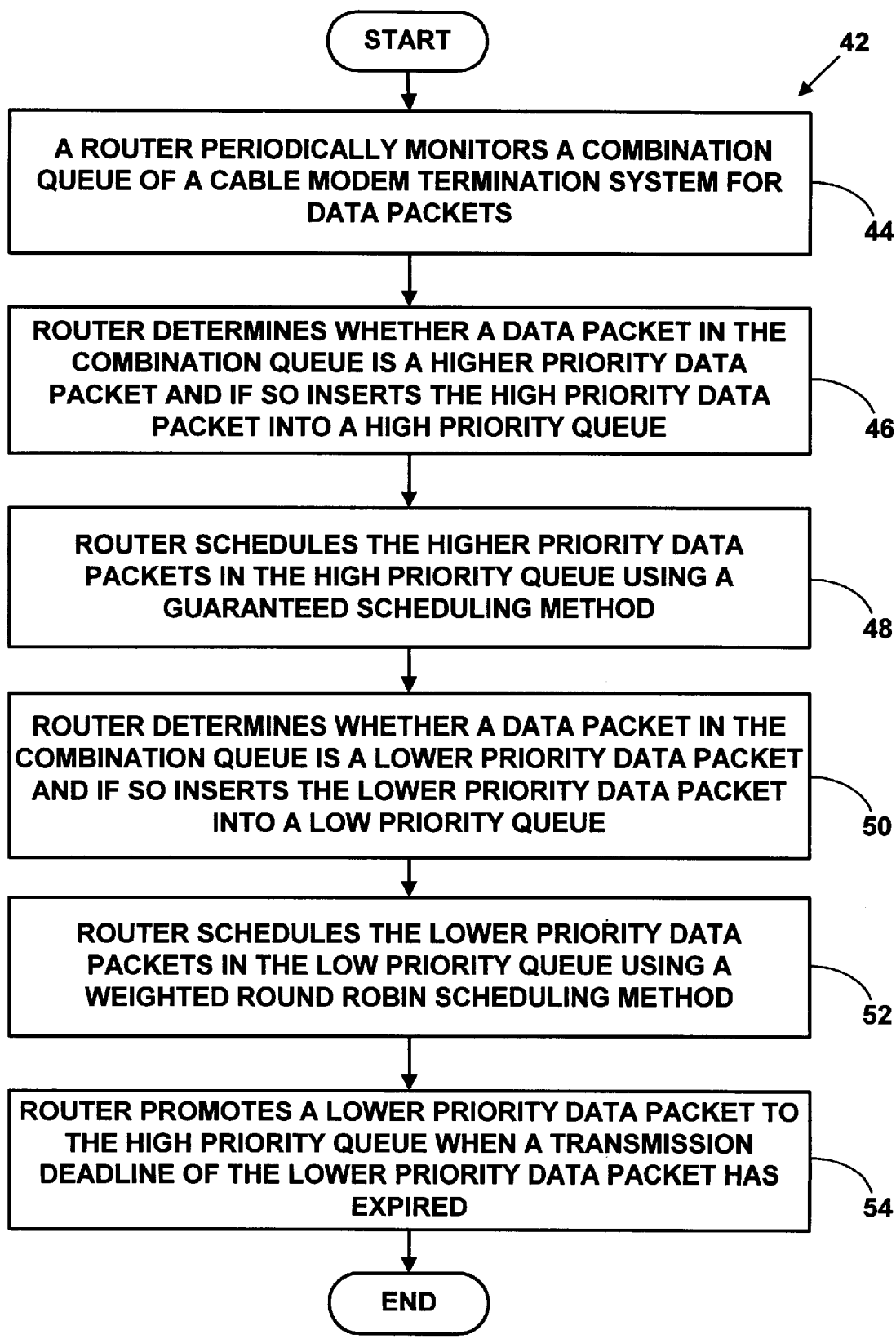
FIG. 3 is a flow diagram illustrating a method for scheduling tasks with a router.

FIG. 3 is a flow diagram illustrating a method 42 for transmitting data packets for a preferred embodiment of the present invention. At step 44, a router periodically monitors a combination queue for the presence of data packets for transmission. At step 46, the router determines whether a data packet in the combination queue is a higher priority data packet and, if so, inserts the data packet into a high priority queue. At step 48, the router schedules the high priority data packets in the high priority queue using a guaranteed scheduling method. As is known in the art, a guaranteed scheduling method is used in network systems to provide service that guarantees a bound on transit delay and bandwidth of service. For more information on guaranteed quality-of-service using a guaranteed scheduling method see Internet Engineering Task Force ("IETF") Request for Comments ("RFC") RFC-2212 incorporated herein by reference. Information for IETF RFCs can be found on World Wide Web at URLs "ds.internic.net" or "www.ietf.org."

At step 50, the router determines whether a data packet in the combination queue is a lower priority data packet and, if so, inserts the lower priority data packet with a transmission deadline into a low priority queue. A transmission deadline prevents the lower priority data packets from being starved out or delayed from transmission time. At step 52, the router schedules the lower priority data packets in the low priority queue using a weighted round robin scheduling method which assigns a transmission deadline to the data packet. As is known in the art, a weighted round robin scheduling method prescribes an order for which data packets in a queue will be executed by assigning a "weight" to each data packet in the queue. The scheduler determines the weight of a data packet by using the transmission deadline and size of the data packet, and the apparent backlog of other data packets in the queue. The weighted round robin scheduling method allows a data packet to execute and may schedule another data packet to execute before completion of the pervious data packet. This prevents the higher priority data packets from starving out lower priority data packets. To satisfy each data packet, the weighted round robin scheduler allows the data packet to execute at differents times until it is complete. The number of times the data packet in the queue executes is proportional to the "weight" the weighted round robin scheduling method assigned to it. At step 54, a router promotes a low priority data packet to the high priority queue when a transmission deadline of the low priority task has expired. Thus, lower priority data packets are not starved from transmission time or bandwidth.

Figure 4:
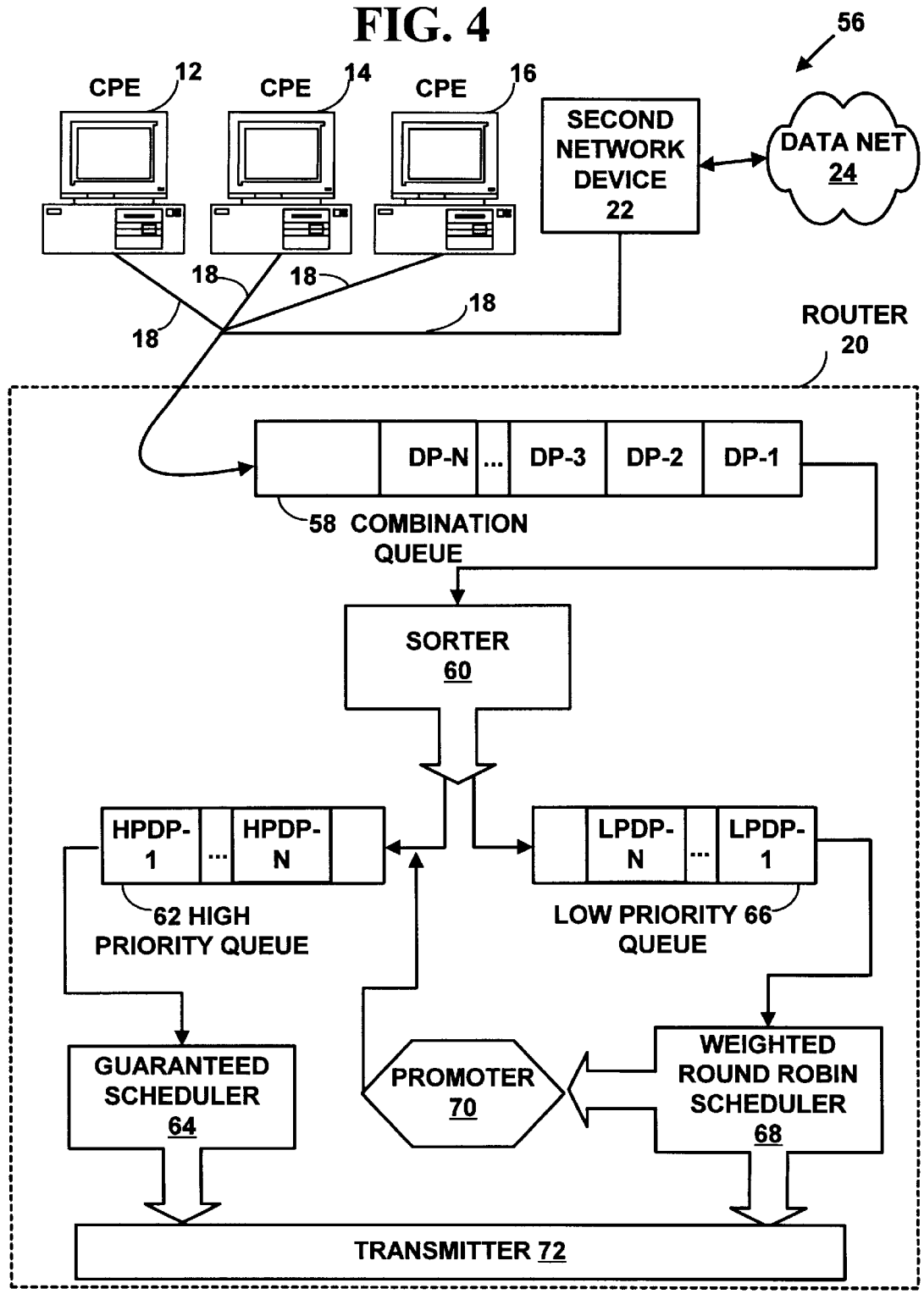
FIG. 4 is a block diagram illustrating a network system and a router for the method of FIG. 3.

FIG. 4 illustrates a preferred embodiment of the present invention using a network system. In FIG. 4, data packets are sent from any or all of CPE 12, 14, 16 and second network device 22. Router 20 places data packets into a combination queue 58. A sorter 60 determines whether a data packet in combination queue 58 is a higher priority data packet and, if so, sorter 60 inserts the higher priority data packet into a high priority queue 62. Router 20 then schedules the data packets in high priority queue 62 using a guaranteed scheduling method 64 scheduler and sends the high priority data packets to a transmitter 72 for execution in the order determined by guaranteed scheduler 64. The preferred embodiment of the present invention utilizes transmitter 72 on router 20; however, the present invention is not limited to router 20. The transmitter may be a channel on CPE 12, 14 and 16 or another network device or devices.

Sorter 60 also determines whether a data packet in combination queue 58 is a lower priority data packet with a transmission deadline and if so, inserts the lower priority data packet into a low priority queue 66. Router 20 then schedules the lower priority data packet in low priority queue 66 using a weighted round robin scheduling method scheduler 68. Once a transmission deadline of a lower priority data packet in low priority queue 66 has expired, a promoter 70 promotes the lower priority data packet to high priority queue 62 whereby the promoted data packet is scheduled by guaranteed scheduling method 64. The lower priority data packet will then be sent to transmitter 72 for execution in the order determined by guaranteed scheduler 64. An illustrative embodiment of the present invention prevents lower priority data packets from being starved out of transmission bandwidth by higher priority data packets while guaranteeing that higher priority data packets are satisfied such as providing the contracted bandwidth.

In another embodiment of the present invention, method 26 is used in an operating system which schedules multiple tasks having both low and high priorities. The present invention is not limited to scheduling and transmission of higher and lower priority data packets and can be used to schedule other higher and lower priority items in a network or operating system. It should be understood that the programs, processes, method, systems and apparatus described herein are not related or limited to any particular type of computer apparatus (hardware or software), unless indicated otherwise. Various types of general purpose or specialized computer apparatus may be used with or perform operations in accordance with the teachings described herein.

The claims should not be read as limited to the described order or elements unless stated to that effect. Therefore, all embodiments that come within the scope and spirit of the following claims and equivalent thereto are claimed as the invention.

I CLAIM:

1. In a network system including a plurality of network devices, a method for scheduling a plurality of data packets of varying priorities, the method comprising of the following steps:

periodically monitoring a first queue including a plurality of data packets of varying priorities on a first network device;

determining a scheduling priority of data packets in the first queue;

inserting higher priority data packets into a second queue;

inserting lower priority data packets into a third queue;

scheduling the higher priority data packets in the second queue wherein data packets in the second queue are transmitted as higher priority data packets;

scheduling the lower priority data packets in the third queue with a transmission deadline, wherein the lower priority data packets are transmitted after the higher priority data packets; and promoting a lower priority data packet in the third queue to the second queue when a transmission deadline for the lower priority data packet has expire, thereby preventing starvation of transmission time for lower priority data packets.

2. A computer readable medium having stored therein instructions for causing a central processing unit to execute the steps of the method of claim 1.

3. The method of claim 1 wherein the first queue is periodically monitored at finite time intervals corresponding to a transmission bandwidth.

4. The method of claim 1 wherein the first queue is a combination queue, the second queue is a high priority queue and the third queue is a low priority queue.

5. The method of claim 1 wherein the priority of a data packet is determined by any of a class-of-service or quality-of-service of a data packet.

6. The method of claim 1 wherein in the step of scheduling the data packets in the second queue includes scheduling the data packets with a guaranteed scheduling method.

7. The method of claim 1 wherein in the step of scheduling the data packets in the third queue includes scheduling the data packets with a weighted round robin scheduling method.

8. The method of claim 1 wherein a data packet is promoted from the low priority queue to the high priority queue is scheduled in the high priority queue with a guaranteed scheduling method at a next finite time interval corresponding to a transmission bandwidth.

9. The method of claim 1 wherein the first network device is a router.

10. In a network system including a plurality of network devices, a method for scheduling data packets, the method comprising of the following steps:

monitoring periodically a combination queue wherein the combination queue includes dual schedulers and a promoter such that both higher priority and lower priority data packets are scheduled for transmission;

determining whether a data packet in the combination queue is a higher priority data packet and if so,
  inserting the higher priority data packet into a high priority queue; and
  scheduling the higher priority data packet in the high priority queue with a guaranteed scheduling method with one of the dual schedulers;

determining whether a data packet in the combination queue is a higher priority data packet and if not,
  inserting a lower priority data packet into a low priority queue;
  scheduling the lower priority data packet in the low priority queue with the other one of the dual schedulers with a weighted round robin scheduling method wherein the lower priority data packet includes a transmission deadline; and
  promoting a lower priority data packet with the promoter to the high priority queue when a transmission deadline of the lower priority data packet has expired.

11. In a network system including a pluralbty of network devices, a method for scheduling data packets, the method comprising of the following steps:

monitoring periodically a combination queue:

determining whether a data packet in the combination queue is a higher priority data packet and if so,
  inserting the higher priority data packet into a high priority queue; scheduling the higher priority data packet in the high priority queue with a guaranteed scheduling method:

determining whether a data packet is a lower priority data packet and if so,
  inserting the lower priority data packet into a low priority queue;
  scheduling the lower priority data packet in the low priority queue with a weighted round robin scheduling method wherein the lower priority data packet includes a transmission deadline; and
  promoting a lower priority data packet to the high priority queue when a transmission deadline of the lower priority data packet has expired.

12. A computer readable medium having stored therein instructions for causing a central processing unit to execute the steps of the method of claim 10.

13. The method of claim 10 wherein the transmission deadline for a data packet is an integer value representing a finite time interval corresponding to transmission bandwidth.

14. The method of claim 10 wherein higher priority data packets are placed in the high priority queue in an order of transmission deadline times.

15. The method of claim 14 wherein a higher priority data packet with a smallest transmission deadline is placed at the head of the high priority queue.

16. The method of claim 14 wherein higher priority data packets are placed in the high priority queue in order from smallest transmission deadline to largest transmission deadline.

17. The method of claim 10 wherein lower priority data packets are placed in the low priority queue in an order of transmission deadlines.

18. The method of claim 10 wherein a lower priority data packet with the smallest transmission deadline is placed at the head of the low priority queue.

19. The method of claim 17 wherein the lower priority data packets are placed in order from smallest transmission deadline to largest transmission deadline.

20. In a network system including a plurality of network devices, a method for scheduling data packets, the method comprising of the following steps:

monitoring periodically a combination queue;

determining whether a data packet in the combination queue is a higher priority data packet and if so,
  inserting the higher priority data packet into a high priority queue; scheduling the higher priority data packet in the high priority queue with a guaranteed scheduling method;

determining whether a data packet is a lower priority data packet and if so,
  inserting the lower priority data packet into a low priority queue; scheduling the lower priority data packet in the low priority queue with a weighted round robin scheduling method wherein the lower priority data packet includes a transmission deadline; and
  Promoting a lower priority data packet to the high priority queue when a transmission deadline of the lower priority data packet has expired, wherein a promoted lower priority data packet placed in the high priority queue is rescheduled by a guaranteed scheduling method.

* * * * *